(12) United States Patent
Plant

(10) Patent No.: US 7,725,390 B2
(45) Date of Patent: May 25, 2010

(54) METHOD AND SYSTEM FOR PROCESSING AN ACCOUNT

(75) Inventor: Laurence John Plant, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/619,708

(22) Filed: Jan. 4, 2007

(65) Prior Publication Data
US 2008/0167986 A1 Jul. 10, 2008

(51) Int. Cl.
*G06Q 40/00* (2006.01)
(52) U.S. Cl. ........................................... 705/39; 705/40
(58) Field of Classification Search .................... 705/39, 705/36, 38
See application file for complete search history.

(56) References Cited

U.S. PATENT DOCUMENTS

| | | | |
|---|---|---|---|
| 6,195,419 B1 | 2/2001 | Gilboy | |
| 6,289,322 B1 * | 9/2001 | Kitchen et al. | 705/40 |
| 6,353,811 B1 | 3/2002 | Weissman | |
| 6,542,590 B1 | 4/2003 | Player et al. | |
| 7,225,154 B2 * | 5/2007 | Hansen | 705/39 |
| 2003/0097331 A1 | 5/2003 | Cohen | |

OTHER PUBLICATIONS

Why hasn't Electronic Bill Presentment and Payment Taken Off? Stefanadis Christodoulos; Current Issues in Economics and Finance, vol. 8, No. 7, Jul./Aug. 2002, Abstract page only.*
Electronic Bill Payment and Presentment: A Primer. Ann Spiotto. 57 Business Lawyer (ABA), 57 Bus. Law (2001-2002), Abstract.*

* cited by examiner

*Primary Examiner*—Hani M. Kazimi
*Assistant Examiner*—Clifford Madamba
(74) *Attorney, Agent, or Firm*—Schmeiser, Olsen & Watts; William H. Steinberg

(57) ABSTRACT

A method and system for processing an account for a transaction between a merchant and a customer. The transaction provided goods and/or services by the merchant to the customer for which the merchant is owed a total payment by the customer to settle the account. The account is divided into N subaccounts. The total payment is divided into N subaccount payments respectively associated with the N subaccounts. N is at least 2. N payers responsible for making the N subaccount payments to settle the N subaccounts are notified of the N subaccounts, respectively. The N subaccounts are made available to the N payers. The N subaccount payments are received from N payment providers using N payment instruments for settling the N subaccounts, respectively. The N payment providers and the N payment instruments were previously identified by the N payers. The total payment is paid to the merchant.

20 Claims, 6 Drawing Sheets

METHOD AND SYSTEM FOR PROCESSING AN ACCOUNT

FIELD OF THE INVENTION

The present invention relates to a method and system for processing an account.

BACKGROUND OF THE INVENTION

Merchants present people with bills or accounts that often comprise multiple charges and transactions. Examples include hotel bills, restaurant bills, telephone bills, credit card bills and car hire bills. While the person who receives the account (i.e., the account receiver) is responsible for paying the bill, the account receiver may wish to recover part of the cost of paying the bill from one or more third parties (third party payer). For example, where several people share accommodation and there is a fixed telephone line, the account receiver will typically settle the account with the phone company and at the same time attempt to recover some of the charges from third party payers, said third party payers being others sharing the accommodation and using the phone. All parties would typically pay a percentage of the line rental charge and be responsible for payment of the itemized calls they have made.

For the account receiver, several issues exist. For example, the account receiver may not receive immediate payment from third party payers for some time after the account is due, resulting in the account receiver making payment out of pocket. As another example, the account receiver may also consume time making repeated attempts to have the third party payer make payment. As yet another example, there is also the problem of multiple, possibly incompatible payment instruments available to the third party payers.

Thus, there is a need for a method and system that alleviates at least one of the aforementioned current difficulties in processing accounts.

SUMMARY OF THE INVENTION

The present invention provides a method for processing an account for a transaction between a merchant and a customer of the merchant, said transaction having provided goods, services, or both goods and services by the merchant to and/or for the customer such that the merchant is owed a total payment to settle the account, said method comprising:

dividing the account into N subaccounts and the total payment into N subaccount payments respectively associated with the N subaccounts, said N being at least 2;

notifying N payers of the N subaccounts, said N payers being responsible for making the N subaccount payments to settle the N subaccounts, respectively;

making the N subaccounts available to the N payers, respectively;

receiving the N subaccount payments from N payment providers using N payment instruments for settling the N subaccounts, respectively, wherein the N payment providers and the N payment instruments had been previously identified by the N payers; and paying the total payment to the merchant, wherein said making the N subaccounts available is performed after said dividing is performed and said receiving the N subaccount payments is performed after said making the N subaccounts available is performed, and wherein said dividing, said making the N subaccounts available, said receiving the N subaccount payments, and said paying the total payment are performed by a subaccounting system.

The present invention provides a process for deploying computing infrastructure, said process comprising integrating computer-readable code into a computing system, wherein the code in combination with the computing system is capable of performing a method for processing an account for a transaction between a merchant and a customer of the merchant, said transaction having provided goods, services, or both goods and services by the merchant to and/or for the customer such that the merchant is owed a total payment to settle the account, said method comprising:

dividing the account into N subaccounts and the total payment into N subaccount payments respectively associated with the N subaccounts, said N being at least 2;

notifying N payers of the N subaccounts, said N payers being responsible for making the N subaccount payments to settle the N subaccounts, respectively;

making the N subaccounts available to the N payers, respectively;

receiving the N subaccount payments from N payment providers using N payment instruments for settling the N subaccounts, respectively, wherein the N payment providers and the N payment instruments had been previously identified by the N payers; and paying the total payment to the merchant, wherein said making the N subaccounts available is performed after said dividing is performed and said receiving the N subaccount payments is performed after said making the N subaccounts available is performed, and wherein said dividing, said making the N subaccounts available, said receiving the N subaccount payments, and said paying the total payment are performed by a subaccounting system.

The present invention provides a method and system that alleviates at least one of the current difficulties in processing accounts.

DETAILED DESCRIPTION OF THE INVENTION

The present invention invention utilizes subaccounting, which comprises business processes and technical infrastructure to enable a customer (i.e., an account receiver) who has been presented by a merchant with an account relating to a bill to break the merchant's account into multiple smaller virtual accounts, called "subaccounts".

The terms "customer" and "account receiver" have the same meaning herein. The present invention relates to a transaction between a merchant and a customer, wherein the transaction provides goods, services, or both goods and services by the merchant to and/or for the customer such that the merchant is owed a total payment to settle the account.

In one embodiment, the customer actually receives the goods, services, or both goods and services of the transaction, and the customer is the account receiver who is responsible for settling the account with the merchant. In this embodiment, the merchant provides the goods, services, or both goods and services "to" the customer.

In one embodiment, one or more parties other than the customer actually receive the goods, services, or both goods and services of the transaction, but the customer nonetheless is the account receiver who is responsible for settling the account with the merchant. In this embodiment, the merchant provides the goods, services, or both goods and services "for" the customer.

In one embodiment, the customer and one or more parties other than the customer collectively receive the goods, services, or both goods and services of the transaction, and the customer is the account receiver who is responsible for settling the account with the merchant. In this embodiment, the merchant provides the goods, services, or both goods and services both "to" the customer and "for" the customer.

The account receiver may allocate the subaccounts to: different payment instruments owned by the account receiver (e.g., the account receiver's corporate charge card, personal credit card, personal check, cash, etc.); and/or different third party payers (e.g., an employer, friends, etc.) who agree in advance, or on receipt of the subaccount notification, to pay the charge with the payment instrument of their choice.

The account receiver may settle the merchant's original account, either as: a single transaction between the merchant and a subaccounting system; or multiple transactions between the merchant and a payment instrument for each subaccount, facilitated by the subaccounting system.

Figure 1:
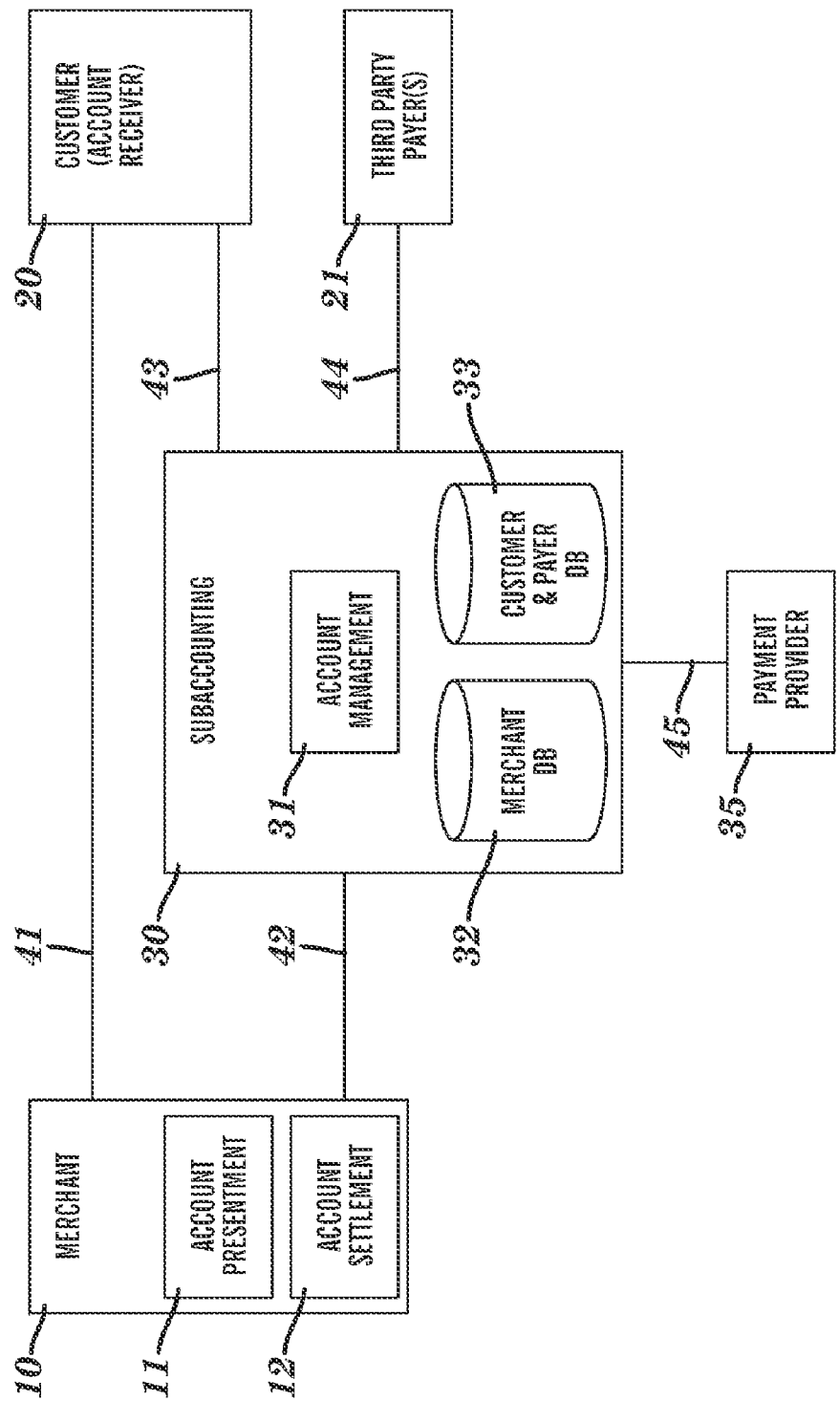
FIG. 1 is a block diagram of an account processing architecture that includes a merchant, a customer, third party payers, a subaccounting system, and payment providers, in accordance with embodiments of the present invention.

FIG. 1 is a block diagram of an account processing architecture that includes a merchant 10, a customer 20, third party payers 21, a subaccounting system 30, and payment providers 35, in accordance with embodiments of the present invention.

The merchant 10 is an entity that has provides goods and/or services to or for the customer 20 for which the merchant 10 is owed a total payment. The merchant 10 may comprise one or more individuals, a business entity, an organization (e.g., a charitable organization, a labor union, etc.), a governmental organization, etc. Examples of a business entity representing the merchant 10 comprise: a sole proprietorship, a partnership, a corporation, a limited liability company (LLC), etc.

The total bill or payment due for the provided goods or services is called an "account". The customer 20, also called an account receiver, is a party who receives a bill or account from the merchant 10 and is responsible for settling the account.

The subaccounting system 30 is a platform which takes an account and enables the customer 10 to identify account transactions or parts of the account (called subaccounts) to be paid for by different parties and/or payment instruments. The customer 20 is an end user of subaccounting 30.

The third party payers 21 comprise one or more entities (i.e., individuals and/or business entities) who are responsible for paying part or all of the account. In one embodiment, the customer 20 is responsible for contributing to the payment of the bill (e.g., the customer 20 is one person of a plurality of persons who enjoy a meal together at a restaurant and collectively share payment of the bill for the meal). In one embodiment, the customer 20 is not responsible for contributing to the payment of the bill (e.g., the customer 20 is one person of a plurality of persons who enjoy a meal together at a restaurant on the date of the customer's birthday, wherein the plurality of persons excluding the customer treat the customer to the meal in celebration of the customer's birthday and otherwise collectively share payment of the bill for the meal).

The payment providers 35 comprise one or more business entities that provide the payment instrument and the funds for settling the account (e.g., a bank that issues a credit card, a telephone company that enables payment from a stored value system such as a prepaid server or a stored value card, personal check, a bank that provides funds such via personal checks or cash, etc.).

The merchant 10 comprises, and/or has access to, an account presentment system 11 and an account settlement system 12. The account presentment system 11 physically produces the account and displays the account to the customer 20. The account settlement system 12 receives payment for the account from the subaccounting system 30.

The subaccounting system 30 comprises account management software 31, a merchant database 32, and a customer and payer database 33. The account management software 31 comprises a computer program which holds the business, presentation and other logic of the subaccounting system 30. The merchant database 32 comprises records of merchants who participate in the subaccounting system 30. The customer and payer database 33 comprises records of users of the subaccounting system 30. The customer 10 is a user of the subaccounting system 30.

The following interfaces are depicted in FIG. 1: a merchant-customer interface 41, a merchant-subaccounting interface 42, a customer-subaccounting interface 43, a third party payer-subaccounting interface 44, and a payment provider-subaccounting interface 45.

The merchant-customer interface 41 is an interface through which the account is transmitted from the merchant 10 to the customer 20, which enables the customer 20 to elect to invoke use of the subaccounting system 30.

The merchant-subaccounting interface 42 is an interface through which the merchant 10 requests that the subaccounting system 30 be invoked. A copy of the account may be passed from the merchant 10 to the subaccounting system 30 via the merchant-subaccounting interface 42. Once the payment is completed, confirmation of the payment of the account is passed from the subaccounting system 30 to the merchant 10 via the merchant-subaccounting interface 42.

The customer-subaccounting interface 43 is an interface through which the subaccounting system 30 presents a data structure comprising data of the account to the customer 20. This data structure enables the customer 20 to select and identify to the subaccounting system 30 (via the customer-subaccounting interface 43) the parts of the account to be paid by different entities (i.e., the third party payers 21) using various payment instruments.

The third party payer-subaccounting interface 44 is an interface through which the subaccounting system 30 notifies the third party payers 21 of the subaccounts and presents the subaccounts to the third party payers 21. The subaccounting system 30 receives from the third party payers 21, via the third party payer-subaccounting interface 44 the details of the payment instrument being used to pay for each subaccount.

The payment provider-subaccounting interface 45 is an interface through which payment is received by the subaccounting system 30 from the payment providers 35.

Figure 2:
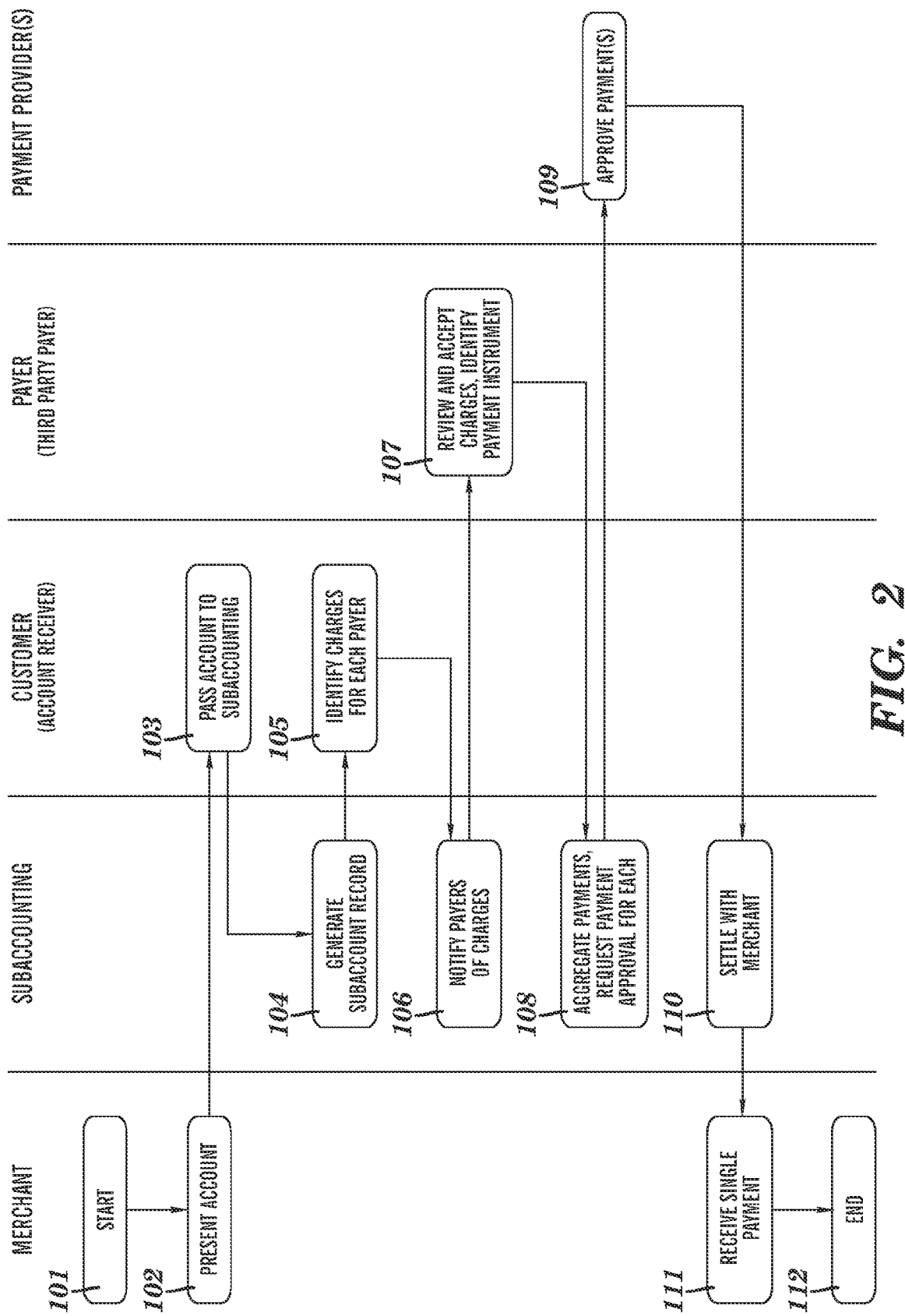
FIG. 2 is a flowchart depicting processing associated with the account processing architecture of FIG. 1 such that subaccount payments are collected before the merchant is paid, in accordance with embodiments of the present invention.

FIG. 2 is a flowchart depicting processing associated with the account processing architecture of FIG. 1 such that subaccount payments are collected before the merchant 10 is paid, in accordance with embodiments of the present invention. The flow chart of FIG. 2 comprises steps 101-112, wherein the steps are distributed into columns to indicate which entity (merchant 10, subaccounting system 30, customer 20, third party payers 21, payment providers 35) performs each step. As indicated in FIG. 2: the merchant 10 performs steps 101-102 and 111; the subaccounting system 30 performs steps 104, 106, 108, and 110; the customer 20 performs steps 103 and 105; the third party payer 21 performs step 107; and the payment provider performs step 109.

In step 101, the process begins with the customer 20 having received goods or services from the merchant 10 and an account having being generated by the merchant 10. The generated account may be in a machine readable format (e.g., in Extensible Markup Language (XML)).

In step 102, the merchant 10 presents or transmits the account to the customer 20 via the merchant-customer interface 41. For example, the account may be presented to a personal computer (PC) or Point of Sale device of the customer 20 located on the premises of the merchant 10. As another example, the account may be transmitted from the merchant 10 to a device held by the customer 20. The presented or transmitted account to the customer 20 may be in a human readable format (e.g., in HyperText Markup Language (HTML)).

In step 103, the customer 20 elects to settle the account by use of the subaccounting system 30 and causes the merchant 10 to pass a copy of the account to the subaccounting system 30 via the merchant-subaccounting interface 42. In one embodiment, the customer 20 may elect to pay the bill by using more than one payment instrument such as, inter alia, use of two different credit cards. The subaccounting system 30 can exist in the computer platform of the merchant 10, or the subaccounting system 30 can be provided by a financial institution such as a bank or credit card company, or the subaccounting system 30 can be an independent company that specializes in payments.

In step 104, the subaccounting system 30 generates one or more records of data pertinent to the account (e.g., in XML) by analyzing the data of the account, identifying the individual transactions of the account, and putting data of the account into a data structure and presentation format which enables the customer 20 to select (in step 105) individual transactions or amounts for payment with different payment instruments.

In step 105, the customer 20 identifies charges for each payer. The customer 20 interacts with the subaccounting system 30, via the customer-subaccounting interface 43, to select different transactions to be paid by the customer 20 with different payment instruments and/or select different transactions to be paid by other parties (i.e., the third party payers 21). Based on the preceding selections of payers by the customer 20, the subaccounting system 30 generates subaccounts, and associated subaccount records, to be settled by the payers. Ther payers comprise the customer 20 and/or the third party payers 21. Each subaccount comprises a charge to be paid each payer. If the customer 20 is to pay at least one of the identified charges of the bill, then or more of the generated subaccounts are to be settled with the customer 20. In other words, the entire account is subdivided into subaccounts to be settled the payers; i.e., with the customer 20, with the third party payers 21, or with both the customer 20 and the third party payers 21.

In step 106, the subaccounting system 30 notifies the payers that there is a charge for the payer to settle. For example, the subaccounting system 30 notifies the third party payers 21, via the third party payer-subaccounting interface 44, that there is a charge for the third party payers 21 to settle. If one or more subaccounts are associated with the customer 20, then the customer 20 is also notified of its charges pertinent to the one or more subaccounts associated with the customer 20. The third party payers 21 can be present with the customer 20 and use the same customer-subaccounting interface 43 to settle their charge. The third party payers 21 can alternatively be located remote from the customer 20, in which case the subaccounting system 30 sends the pertinent subaccounts to the third party payers 21 individually or to a link from which the subaccounts can be retrieved by the third party payers 21.

In step 107, the third party payers 21 (and the customer 20 if associated with one or more subaccounts) review and accept the charges on their respective subaccounts, and identify to the subaccounting system 30, via the third party payer-subaccounting interface 44, a payment instrument for each subaccount (e.g., funds transfer, credit card, check, personal check, cash, etc.).

The third party payers 21 can also elect to invoke subaccounting so that the third party payers 21 can settle with more than one payment instrument or nominate alternate third party payers to be responsible for part or full payment of the subaccount.

In step 108, the subaccounting system requests that the payment providers 35 authorize payment for the respective subaccounts via the identified payment instruments for the respective subaccounts. Each payment request to the payment provider associated with each subaccount may include the identification of the payer of the subaccount, an identification of the transaction associated with the subaccount, the relevant payment instrument, and authorization by the payer for the payment provider to pay the amount due. The payments are to be executed, electronically or non-electronically, by the payment providers 35 using the identified payment instruments. For example, if the funds are to be transferred online, then the credit card will be charged to the associated credit card company who is the pertinent payment provider.

In step 109, the payment providers 35 authorize the payments associated with the subaccounts and make the payments for the subaccounts to the subaccounting system 30 via the payment provider-subaccounting interface 45.

In step 110, the subaccounting system 30 settles the account with the merchant 10 by paying the full balance of the account to the merchant 10 in a single payment.

In step 111, the merchant 10 receive the single payment that the subaccounting system 30 made in step 110.

In step 112, the process ends.

Figure 3:
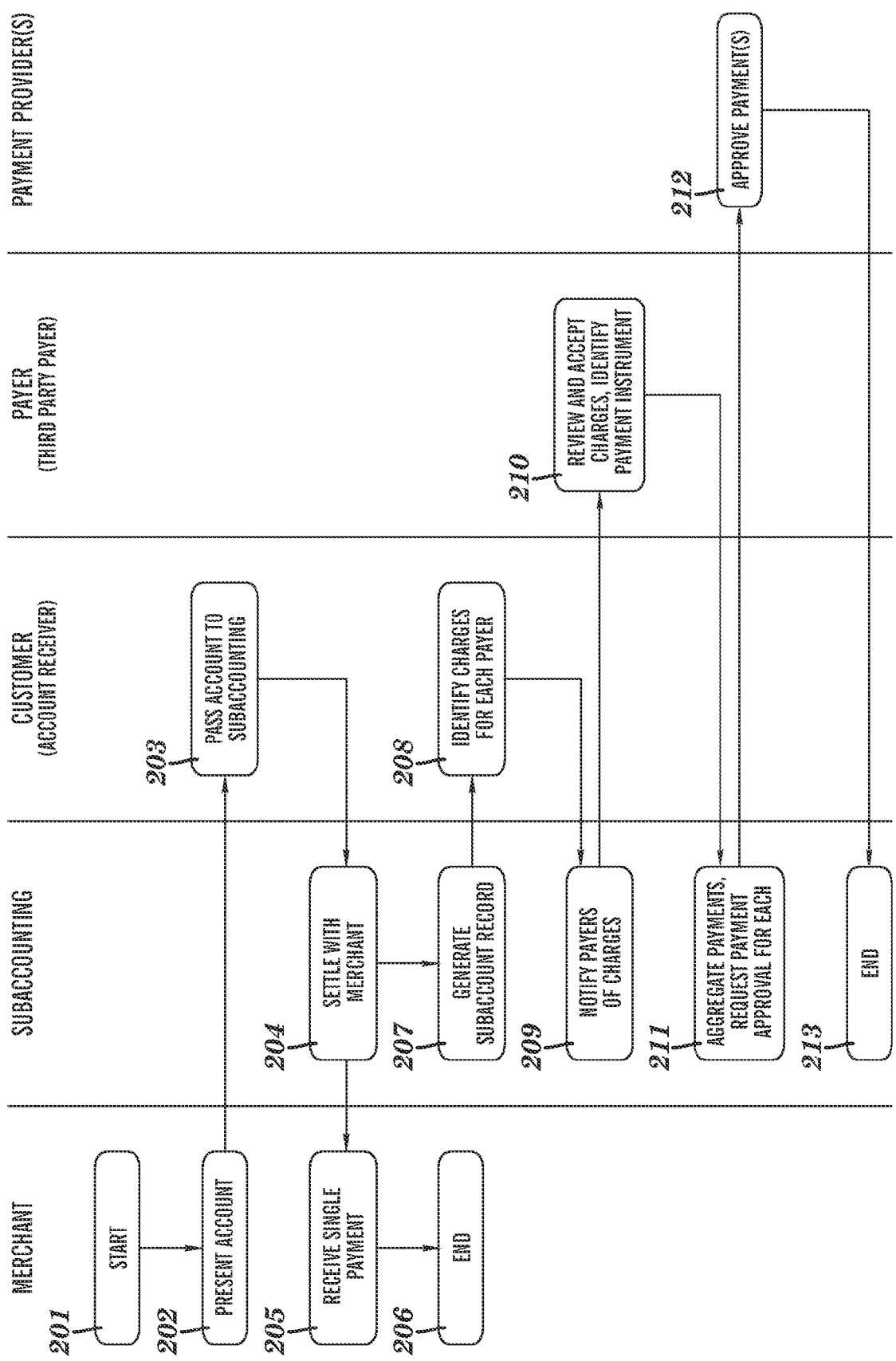
FIG. 3 is a flowchart depicting processing associated with the account processing architecture of FIG. 1 such that subaccount payments are collected after the merchant is paid, in accordance with embodiments of the present invention.

FIG. 3 is a flowchart depicting processing associated with the account processing architecture of FIG. 1 such that subaccount payments are collected after the merchant is paid, in accordance with embodiments of the present invention. The flow chart of FIG. 2 comprises steps 201-213, wherein the steps are distributed into columns to indicate which entity (merchant 10, subaccounting system 30, customer 20, third party payer 21, payment provider 35) performs each step. As indicated in FIG. 3: the merchant 10 performs steps 201, 202, 205, and 206; the subaccounting system 30 performs steps 204, 207, 209, 211, 213; the customer 20 performs steps 203 and 208; the third party payer 21 performs step 210; and the payment provider performs step 212.

In step 201, the process begins with the customer 20 having received goods or services from the merchant 10 and an account having being generated by the merchant 10. The generated account may be in a machine readable format (e.g., in XML).

In step 202, the merchant 10 presents or transmits the account to the customer 20 via the merchant-customer interface 41. For example, the account may be presented to a personal computer (PC) or Point of Sale device of the customer 20 located on the premises of the merchant 20. As another example, the account may be transmitted from the merchant 20 to a device held by the customer 20. The presented or transmitted account to the customer 20 may be in a human readable format (e.g., in HTML).

In step 203, the customer 20 elects to settle the account by use of subaccounting and causes the merchant 10 to pass a copy of the account to the subaccounting system 30 via the merchant-subaccounting interface 42. In one embodiment, the customer 20 may elect to pay the bill by using more than one payment instrument such as, inter alia, use of two different credit cards. The subaccounting system 30 can exist in the computer platform of the merchant 10, or the subaccounting system 30 can be provided by a financial institution such as a bank or credit card company, or the subaccounting system 30 can be an independent company that specializes in payments.

In step 204, the subaccounting system 30 settles the account with the merchant 10 by paying the full balance of the account to the merchant 10 in a single payment.

In step 205, the merchant 10 receive the single payment that the subaccounting system 30 made in step 204.

In step 206, the process ends from the perspective of the merchant 10. However, the settling of the subaccounts remains to be executed in steps 207-212.

In step 207, the subaccounting system 30 generates one or more records of data pertinent to the account (e.g., in XML) by analyzing the data of the account, identifying the individual transactions of the account, and putting data of the account into a data structure and presentation format which enables the customer 20 to select (in step 208) individual transactions or amounts for payment with different payment instruments.

In step 208, the customer 20 identifies charges for each payer. The customer 20 interacts with the subaccounting system 30, via the customer-subaccounting interface 43, to select different transactions to be paid by the customer 20 with different payment instruments and/or select different transactions to be paid by other parties (i.e., the third party payers 21). Based on the preceding selections of payers by the customer 20, the subaccounting system 30 generates subaccounts, and associated subaccount records, to be settled by the payers. Ther payers comprise the customer 20 and/or the third party payers 21. Each subaccount comprises a charge to be paid each payer. If the customer 20 is to pay at least one of the identified charges of the bill, then or more of the generated subaccounts are to be settled with the customer 20. In other words, the entire account is subdivided into subaccounts to be settled the payers; i.e., with the customer 20, with the third party payers 21, or with both the customer 20 and the third party payers 21.

In step 209, the subaccounting system 30 notifies the payers that there is a charge for the payer to settle. For example, the subaccounting system 30 notifies the third party payers 21, via the third party payer-subaccounting interface 44, that there is a charge for the third party payers 21 to settle. If one or more subaccounts are associated with the customer 20, then the customer 20 is also notified of its charges pertinent to the one or more subaccounts associated with the customer 20. The third party payers 21 can be present with the customer 20 and use the same customer-subaccounting interface 43 to settle their charge. The third party payers 21 can alternatively be located remote from the customer 20, in which case the subaccounting system 30 sends the pertinent subaccounts to the third party payers 21 individually or to a link from which the subaccounts can be retrieved by the third party payers 21.

In step 210, the third party payers 21 (and the customer 20 if associated with one or more subaccounts) review and accept the charges on their respective subaccounts, and identify to the subaccounting system 30, via the third party payer-subaccounting interface 44, a payment instrument for each subaccount (e.g., funds transfer, credit card, check, personal check, cash, etc.).

In step 211, the subaccounting system requests that the payment providers 35 authorize payment for the respective subaccounts via the identified payment instruments for the respective subaccounts. Each payment request to the payment provider associated with each subaccount may include the identification of the payer of the subaccount, an identification of the transaction associated with the subaccount, the relevant payment instrument, the amount of money to be paid, and authorization by the payer for the payment provider to pay the amount due. The payments are to be executed, electronically or non-electronically, by the payment providers 35 using the identified payment instruments. For example, if the funds are to be transferred online, then the credit card will be charged to the associated credit card company who is the pertinent payment provider.

In step 212, the payment providers 35 authorize the payments associated with the subaccounts and make the payments for the subaccounts to the subaccounting system 30 via the payment provider-subaccounting interface 45.

In step 213, the process ends.

Figure 4:
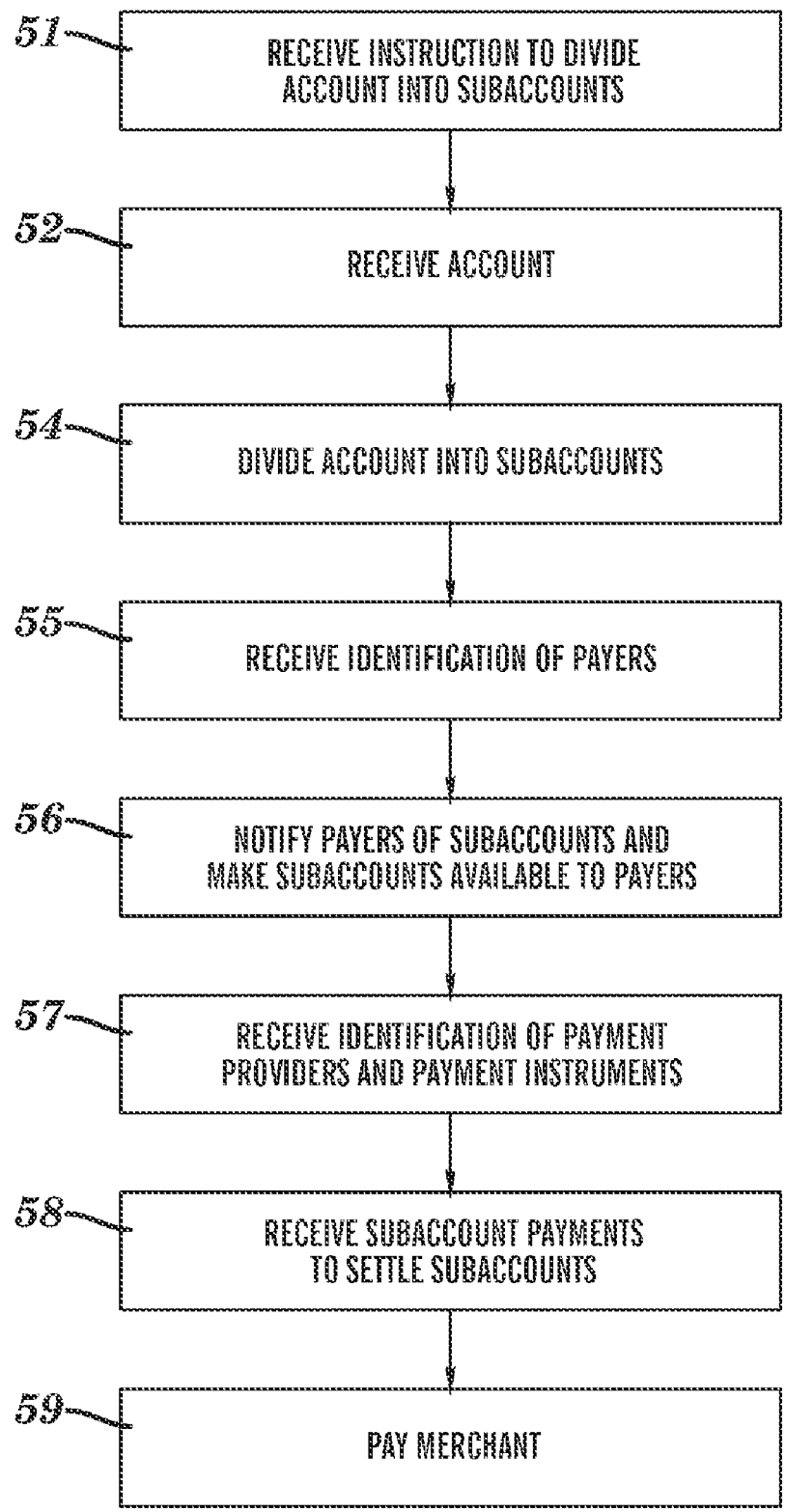
FIG. 4 is a flowchart depicting processing by the subaccounting system of FIG. 1 according to the flow chart of FIG. 2 wherein subaccount payments are collected before the merchant is paid, in accordance with embodiments of the present invention.

FIG. 4 is a flowchart depicting processing by the subaccounting system of FIG. 1 according to the flow chart of FIG. 2 wherein subaccount payments are collected before the merchant is paid, in accordance with embodiments of the present invention. The flow chart of FIG. 4 comprises steps 51-52 and 54-59 which are performed by the subaccounting system 30.

In step 51, the subaccounting system 30 receives an instruction from the customer 20 to divide the account into N subaccounts and the total payment owed to the merchant 10 by the customer 20 into N subaccount payments respectively associated with the N subaccounts, wherein N is a positive integer of at least 2.

In step 52, the subaccounting system 30 receives the account from the merchant 10.

In step 54, the subaccounting system 30 divides the account into the N subaccounts and the total payment into the N subaccount payments, according to the instruction received in step 51.

In step 55, the subaccounting system 30 receives from the customer 20 an identification of N payers who are responsible for making or triggering payment of the N subaccount payments to the subaccounting system 30 to settle the N subaccounts, respectively. The N payers comprise the customer 20, the third party payers 21, or a combination thereof.

In step 56, the subaccounting system 30 notifies the N payers of the N subaccounts and makes the N subaccounts available to N payers, respectively.

In step 57, the subaccounting system 30 receives from the N payers an identification of N payment providers and N payment instruments, respectively.

In step 58, the subaccounting system 30 receives the N subaccount payments from the N payment providers using the N payment instruments for settling the N subaccounts, respectively.

In step 59, the subaccounting system 30 pays the merchant the total payment owed to the merchant.

Figure 5:
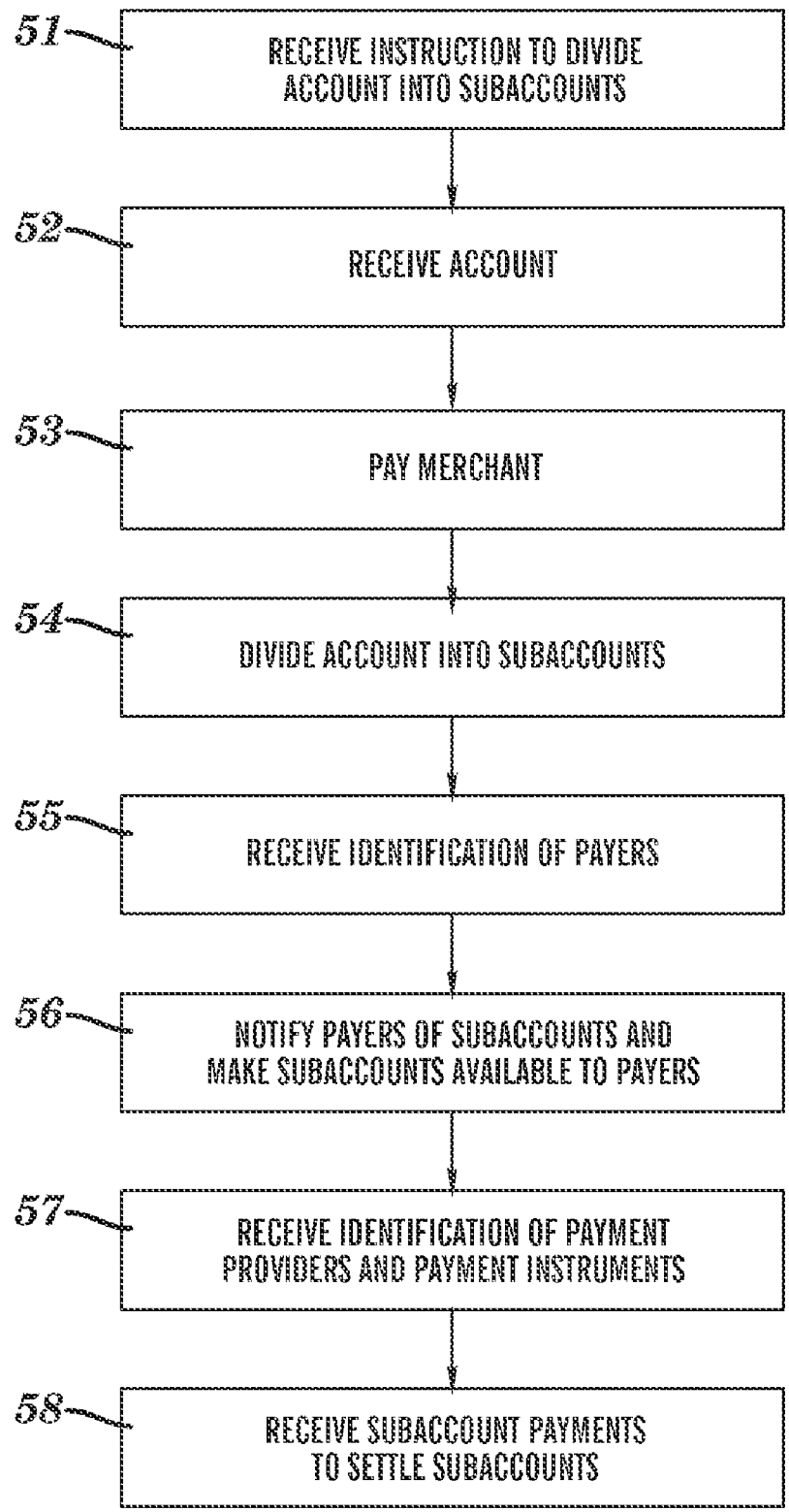
FIG. 5 is a flowchart depicting processing by the subaccounting system of FIG. 1 according to the flow chart of FIG. 3 wherein subaccount payments are collected after the merchant is paid, in accordance with embodiments of the present invention.

FIG. 5 is a flowchart depicting processing by the subaccounting system of FIG. 1 according to the flow chart of FIG. 3 wherein subaccount payments are collected after the merchant is paid, in accordance with embodiments of the present invention. The flow chart of FIG. 4 comprises steps 51-58 which are performed by the subaccounting system 30. The steps 51-52 and 54-58 exist in the flow charts of both FIGS. 4 and 5 and are the same steps in both flow charts. The flow chart of FIG. 5 differs from the flow chart of FIG. 4 as follows. In the flow chart of FIG. 4, the subaccount payments are collected in step 58 before the merchant is paid in step 59. In contrast in the flow chart of FIG. 5, the subaccount payments are collected in step 58 after the merchant is paid in step 53. Generally, the present invention includes variations in the flow chart of FIG. 5 such that the merchant may be paid after step 52 and before step 58 such as: in step 53, between steps 53 and 54, between steps 54 and 55, between steps 55 and 56, between steps 56 and 57, or between steps 57 and 58.

The N payers referred to in steps 55 and 56 of FIGS. 4 and 5 authorize the N payment providers to pay the N subaccount payments using the N payment instruments, respectively, to support implementation of the collection of the N subaccount payments by the subaccounting system 30 in step 58.

In a first embodiment, the N payers comprise (or consist of) the customer 20 appearing as two or more distinct payers. For example if subaccounts A1 and A2 have associated subaccount payments S1 and S2, the customer C may be a first payer authorizing a first payment provider (e.g., a bank) to pay the subaccount payments S1 using a payment instrument of a personal check, and the customer C may also be a second payer authorizing a second payment provider (e.g., a credit card company) to pay the subaccount payments S2 using a payment instrument of a credit card. In this first embodiment the first payer and the second payer may be represented symbolically as C, C.

In a second embodiment, the N payers comprise (or consist of) two or more different third party payers 21 appearing as two or more distinct payers. For example if subaccounts A1 and A2 have associated subaccount payments S1 and S2, a third party payer P1 may be a first payer authorizing a first payment provider (e.g., a bank) to pay the subaccount payments S1 using a payment instrument of a personal check, and a third party payer P2 may be a second payer authorizing a second payment provider (e.g., a credit card company) to pay the subaccount payments S2 using a payment instrument of a credit card. In this second embodiment the first payer and the second payer may be represented symbolically as P1, P2.

In a third embodiment, the N payers comprise (or consist of) a third party payers 21 appearing as a first payer and the customer 20 appearing as one or more distinct payers. For example if subaccounts A1 and A2 have associated subaccount payments S1 and S2, a third party payer P1 may be a first payer authorizing a first payment provider (e.g., a bank) to pay the subaccount payments S1 using a payment instrument of a personal check, and the customer C may be a second payer authorizing a second payment provider (e.g., a credit card company) to pay the subaccount payments S2 using a payment instrument of a credit card. In this third embodiment the first payer and the second payer may be represented symbolically as P1, C.

Generally, the N payers comprise: the customer C as one or more payers, one or more third party payers (P1, P2, P3, . . . ), or any combination of the customer C as one or more payers and one or more third party payers (P1, P2, P3, . . . ). Table 1 lists various illustrative embodiments for the N payers.

TABLE 1

| Embodiment | N | Payers |
| --- | --- | --- |
| 1 | 2 | C, C |
| 2 | 2 | P1, P2 |
| 3 | 2 | P1, C |
| 4 | 3 | C, C, C |
| 5 | 3 | C, C, P1 |
| 6 | 3 | C, P1, P2 |
| 7 | 3 | P1, P2, P3 |
| 8 | 4 | C, C, C, C |
| 9 | 4 | C, C, C, P1 |
| 10 | 4 | C, C, P1, P2 |
| 11 | 4 | C, P1, P2, P3 |
| 12 | 4 | P1, P2, P3, P4 |

In Table 1, Embodiments 1, 2, and 3 respectively represent the first, second, and third embodiments described supra.

In accordance with the preceding descriptions of FIGS. 1-5, the relevant data structures for the account and the subaccounts are as follows. Noting that the account is presented by the merchant 10 to the customer 20, the original account data may be in different merchant-specific formats and may be normalised by the subaccounting system 30 into a standard XML format. The fields of the account and subaccount may comprise the fields, or a subset thereof, depicted in Table 2.

TABLE 2

| FIELD OF ACCOUNT | FIELD OF SUBACCOUNT |
| --- | --- |
| Merchant identification | Merchant identification |
| Date of account generation | Date of account generation |
| Customer identification | Customer identification |
| Payer identification | |
| Total charges to customer | Total charges to payer |
| Individual charges to customer (date, description, amount) | Individual charges to payer (date, description, amount) |
| Tax | Tax |
| Discounts | Discounts |
| Amount brought forward | Amount brought forward |
| Amount owed by customer | Amount owed by payer |
| Due date for payment of total charges | Due date for payment of total charges |

In accordance with the preceding descriptions of FIGS. 1-5, the subaccounting system of the present invention supports all payer and merchant payment instruments. As a business model, the subaccounting process can either be deployed as a web-based payments intermediary (such as an existing payments service provider) or deployed by the merchant as a value added service.

Where the subaccounting system is acting as an intermediary, revenue is earned by the subaccounting system via: (1) charging the customer one or more of a subscription fee, usage fee, late payment fee; (2) use of monies received from payers prior to settling with the merchant (e.g., receiving immediate payment from payers and settling with the merchant 30 days later, and earning interest on the money for the 30 day period); and/or (3) charging the merchant a subscription fee and/or a percentage of monies settled.

The subaccounting process supports all payment instruments such as credit cards, debit cards, charge cards, pre and post-paid phone bills, stored value cards, cash, etc.

The subaccounting process advantageously allows the customer to break an account into parts and distribute those parts to different payment instruments or entities for settlement, which enables settlement of an account such as a restaurant or phone bill when multiple parties are paying.

The subaccounting process allows each customer to use the payment instrument of each customer's choice, as opposed to being limited to the payment instruments supported by the merchant. This enables each customer to use each customer's preferred payment instrument even if not supported by the merchant, and also enables each customer to settle an account in a location where each customer has no payment instrument supported by the merchant.

The subaccounting process can fully or partly settle with the merchant before all payers have settled all subaccounts, which enables the merchant to be paid the remainder of the amount billed when only a small percentage of the account is in dispute.

The subaccounting process allows the payments provider to charge for a set of transactions on the one account. In addition to the payments provider earning money each time the payment service is used to pay the account, the payments provider can also earn money each time the payment service of the payments provider is used on each subaccount.

The following examples illustrate use of the present invention for processing an account via subaccounting.

In a first example illustrating the present invention, an employee travelling on company business checks out of a hotel. The hotel presents the employee with the account which is displayed on a screen to the employee. The employee reviews the account and nominates a personal credit card by swiping it. The employee checks individual charges for personal expenses incurred to the hotel while staying at the hotel and allocates them to the personal credit card. The employee then swipes a corporate credit card and assigns the balance of the account for charges owed to the hotel to the corporate credit card. The full account is settled with the hotel. The personal credit card and the corporate credit card each receives a charge, and an itemised subaccount for each credit card charge is printed. The hotel receives either two credit card payments from the employee, or the subaccounting system aggregates payments it has received and makes a single payment to the hotel.

In a second example illustrating the present invention, a group of three individuals hire a car. On picking up the car, only one of the three people gives a credit card to the car hire company. At the end of the hire period, the car is returned and the car hire company calculates charges based on insurance, duration of hire, distance travelled, and price of fuel required to fill the tank. A first individual of the three individuals, who used the first individual's credit card to hire the car, is presented the full account and elects to invoke the subaccounting process. The first individual elects to pay for the insurance and fuel, and passes the user interface to a second individual of the three individuals who swipes the second individual's credit card and pays for 50% of the outstanding balance. The third individual of the three individuals offers cash to pay for the outstanding balance and the car hire company confirms the hire company has received cash to pay the balance. The subaccounting system makes a single payment to the car hire company (being the sum of the credit card transactions for the first and second individuals) and makes individual charges against the credit cards of the first and second individuals who paid on credit cards. Each individual is issued a receipt.

In a third example illustrating the present invention, a parent has agreed to fund an afternoon at the movies for children of the parent. The children go to a cinema with a guardian (i.e., not the parent) and a first child of the children indicates who is to pay by entering the subaccounting identification (ID) number of the parent. The subaccounting system pays the full amount to the cinema and the children receive the movie tickets. The subaccounting system then initiates recovery of the charge for the tickets from the parent. The parent is at work and message is pushed to the mobile phone of the parent. The message communicates that a payment is requested. Using the mobile phone, the parent reviews the charges, select the parent's credit card (details already known to the subaccounting system) to pay for 50% of the cost of the movie tickets. The parent identifies an other party to pay for the balance by selecting the other party from a list of people already registered with the subaccounting system as being associated with the parent. The subaccounting system notifies the other party of the charge by e-mail. Some time later, the other party logs on to Internet banking and makes an online payment to the subaccounting system and identifies the specific transaction ID the payment is associated with. The subaccounting system closes out the account as having been fully recovered.

Figure 6:
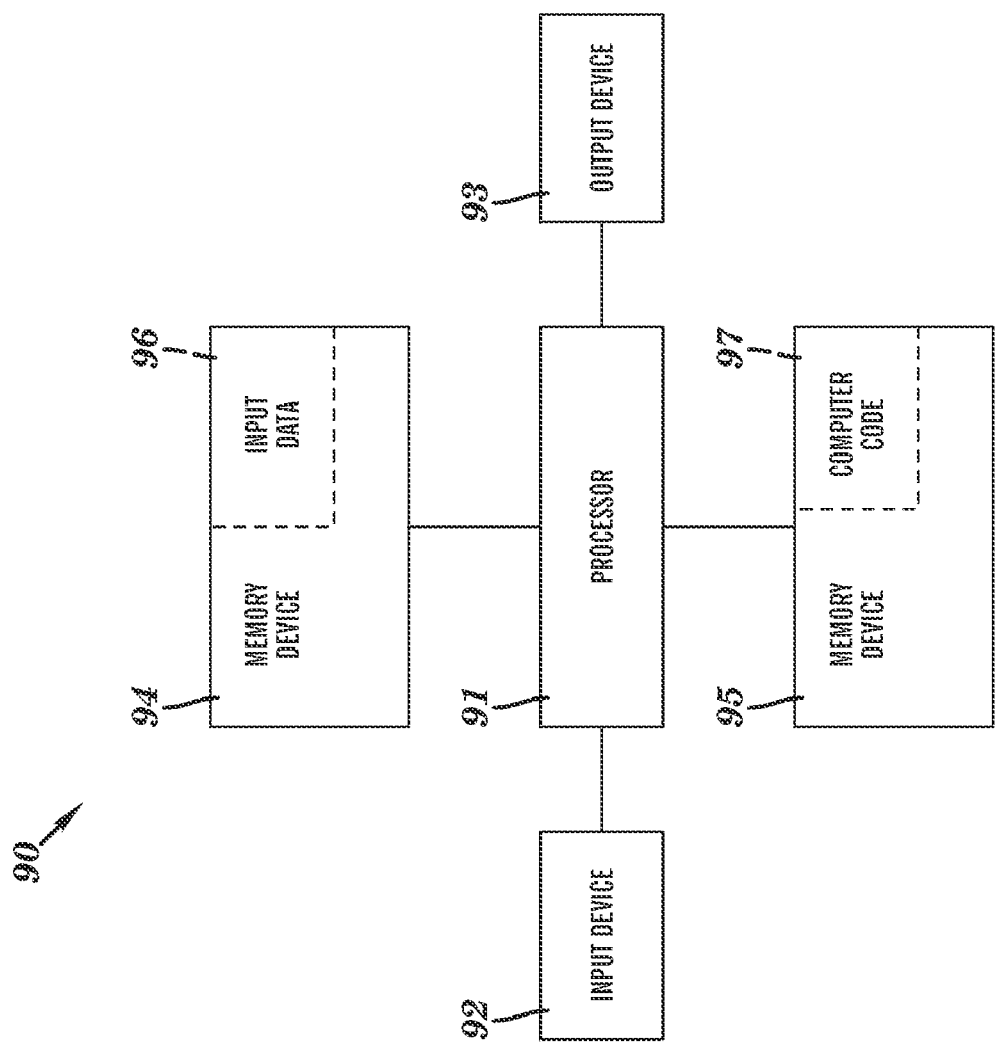
FIG. 6 illustrates a computer system 90 used for processing an account according to the present invention.

FIG. 6 illustrates a computer system 90 used for processing an account according to the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for processing an account according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for processing an account according to the present invention.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing an account for a transaction between a merchant and a customer of the merchant, said transaction having provided goods, services, or both goods and services by the merchant to and/or for the customer such that the merchant is owed a total payment to settle the account, said method comprising executing computer readable program code on a processor of a computer system, said program code being stored on computer readable memory unit of the computer system, said processor being coupled to the memory unit, said executing comprising:

a subaccounting system receiving the account;

after said receiving the account, said subaccounting system dividing the account into N subaccounts and the total payment into N subaccount payments respectively associated with the N subaccounts, said N being at least 2, said account comprising the total payment owed to the merchant, said N subaccounts respectively comprising the N subaccount payments required for settling the account;

after said dividing, said subaccounting system receiving from the customer an identification of N payers who are responsible for making or triggering payment of the N subaccount payments to the subaccounting system to settle the N subaccounts, respectively;

after said receiving from the customer the identification of the N payers, said subaccounting system notifying the N payers of the N subaccounts that respectively comprise the N subaccount payments required for settling the account;

after said notifying, said subaccounting system making the N subaccounts available to N payers, respectively;

after said making the N subaccounts available to the N payers, said subaccounting system receiving from the N payers an identification of N payment providers and N payment instruments, respectively;

after said receiving from the N payers the identification of the N payment providers and the N payment instruments, said subaccounting system receiving the N subaccount payments from the N payment providers using the N payment instruments for settling the N subaccounts, respectively; and said subaccounting system paying the total payment to the merchant.

2. The method of claim 1, wherein said receiving the N subaccount payments is performed before said paying the total payment is performed.

3. The method of claim 1, wherein said receiving the N subaccount payments is performed after said paying the total payment is performed.

4. The method of claim 3, wherein said paying the total payment is performed before said dividing is performed.

5. The method of claim 1, wherein each payer of the N payers is the customer.

6. The method of claim 1, wherein the N payers comprise two or more different third party payers appearing as two or more distinct payers of the N payers.

7. The method of claim 1, wherein the N payers comprise a third party payer and the customer.

8. The method of claim 1, wherein the account received by the accounting system is characterized by fields comprising: an identification of the merchant, a date of generation of the account, an identification of the customer, the total charges to the customer for the transaction, a date, amount, and description of individual charges to the customer for the transaction, a tax pertaining to the transaction, a discount associated with the transaction, an amount brought forward for the transaction, and a due date for payment of the total charges, and wherein the fields do not include an identification of the N payers.

9. The method of claim 1, said method further comprising:

said accounting system paying the total payment to the merchant 30 days after said subaccounting system has received the N subaccount payments from the N payment providers;

said accounting system earning interest on the total payment during said 30 days; and said accounting system charging the merchant a percentage of the total payment.

10. A process for deploying computing infrastructure, said process comprising integrating computer-readable program code into a computer system, wherein the program code in combination with the computer system is capable of performing a method for processing an account for a transaction between a merchant and a customer of the merchant, said transaction having provided goods, services, or both goods and services by the merchant to and/or for the customer such that the merchant is owed a total payment to settle the account, said method comprising executing the program code on a processor of the computer system, said program code being stored on computer readable memory unit of the computer system, said processor being coupled to the memory unit, said executing comprising:

a subaccounting system receiving the account;

after said receiving the account, said subaccounting system dividing the account into N subaccounts and the total payment into N subaccount payments respectively associated with the N subaccounts, said N being at least 2, said account comprising the total payment owed to the merchant, said N subaccounts respectively comprising the N subaccount payments required for settling the account;

after said dividing, said subaccounting system receiving from the customer an identification of N payers who are responsible for making or triggering payment of the N subaccount payments to the subaccounting system to settle the N subaccounts, respectively;

after said receiving from the customer the identification of the N payers, said subaccounting system notifying the N payers of the N subaccounts that respectively comprise the N subaccount payments required for settling the account;

after said notifying, said subaccounting system making the N subaccounts available to N payers, respectively;

after said making the N subaccounts available to the N payers, said subaccounting system receiving from the N payers an identification of N payment providers and N payment instruments, respectively;

after said receiving from the N payers the identification of the N payment providers and the N payment instruments, said subaccounting system receiving the N subaccount payments from the N payment providers using the N payment instruments for settling the N subaccounts, respectively; and said subaccounting system paying the total payment to the merchant.

11. The process of claim 10, wherein said receiving the N subaccount payments is performed before said paying the total payment is performed.

12. The process of claim 10, wherein said receiving the N subaccount payments is performed after said paying the total payment is performed.

13. The process of claim 12, wherein said paying the total payment is performed before said dividing is performed.

14. The process of claim 10, wherein each payer of the N payers is the customer.

15. The process of claim 10, wherein the N payers comprise two or more different third party payers appearing as two or more distinct payers of the N payers.

16. The process of claim 10, wherein the N payers comprise a third party payer and the customer.

17. The process of claim 10, wherein the account received by the accounting system is characterized by fields comprising: an identification of the merchant, a date of generation of the account, an identification of the customer, the total charges to the customer for the transaction, a date, amount, and description of individual charges to the customer for the transaction, a tax pertaining to the transaction, a discount associated with the transaction, an amount brought forward for the transaction, and a due date for payment of the total charges, and wherein the fields do not include an identification of the N payers.

18. The process of claim 10, said executing further comprising:
   said accounting system paying the total payment to the merchant 30 days after said subaccounting system has received the N subaccount payments from the N payment providers;
   said accounting system earning interest on the total payment during said 30 days; and
   said accounting system charging the merchant a percentage of the total payment.

19. A computer program product comprising a computer readable storage medium having a computer readable program code stored therein, said computer readable program code configured be executed by a processor of a computer system to implement a method for processing an account for a transaction between a merchant and a customer of the merchant, said transaction having provided goods, services, or both goods and services by the merchant to and/or for the customer such that the merchant is owed a total payment to settle the account, said method comprising:
   a subaccounting system receiving the account;
   after said receiving the account, said subaccounting system dividing the account into N subaccounts and the total payment into N subaccount payments respectively associated with the N subaccounts, said N being at least 2, said account comprising the total payment owed to the merchant, said N subaccounts respectively comprising the N subaccount payments required for settling the account;
   after said dividing, said subaccounting system receiving from the customer an identification of N payers who are responsible for making or triggering payment of the N subaccount payments to the subaccounting system to settle the N subaccounts, respectively;
   after said receiving from the customer the identification of the N payers, said subaccounting system notifying the N payers of the N subaccounts that respectively comprise the N subaccount payments required for settling the account;
   after said notifying, said subaccounting system making the N subaccounts available to N payers, respectively;
   after said making the N subaccounts available to the N payers, said subaccounting system receiving from the N payers an identification of N payment providers and N payment instruments, respectively;
   after said receiving from the N payers the identification of the N payment providers and the N payment instruments, said subaccounting system receiving the N subaccount payments from the N payment providers using the N payment instruments for settling the N subaccounts, respectively; and
   said subaccounting system paying the total payment to the merchant.

20. A computer system comprising a processor and a memory device coupled to the processor, said memory device containing program code configured to be executed by the processor to implement a method for processing an account for a transaction between a merchant and a customer of the merchant, said transaction having provided goods, services, or both goods and services by the merchant to and/or for the customer such that the merchant is owed a total payment to settle the account, said method comprising:
   a subaccounting system receiving the account;
   after said receiving the account, said subaccounting system dividing the account into N subaccounts and the total payment into N subaccount payments respectively associated with the N subaccounts, said N being at least 2, said account comprising the total payment owed to the merchant, said N subaccounts respectively comprising the N subaccount payments required for settling the account;
   after said dividing, said subaccounting system receiving from the customer an identification of N payers who are responsible for making or triggering payment of the N subaccount payments to the subaccounting system to settle the N subaccounts, respectively;
   after said receiving from the customer the identification of the N payers, said subaccounting system notifying the N payers of the N subaccounts that respectively comprise the N subaccount payments required for settling the account;
   after said notifying, said subaccounting system making the N subaccounts available to N payers, respectively;
   after said making the N subaccounts available to the N payers, said subaccounting system receiving from the N payers an identification of N payment providers and N payment instruments, respectively;
   after said receiving from the N payers the identification of the N payment providers and the N payment instruments, said subaccounting system receiving the N subaccount payments from the N payment providers using the N payment instruments for settling the N subaccounts, respectively; and
   said subaccounting system paying the total payment to the merchant.

* * * * *